Sept. 1, 1925.  J. F. L. BAKER  1,551,781
STAY BOLT
Filed Jan. 11, 1924
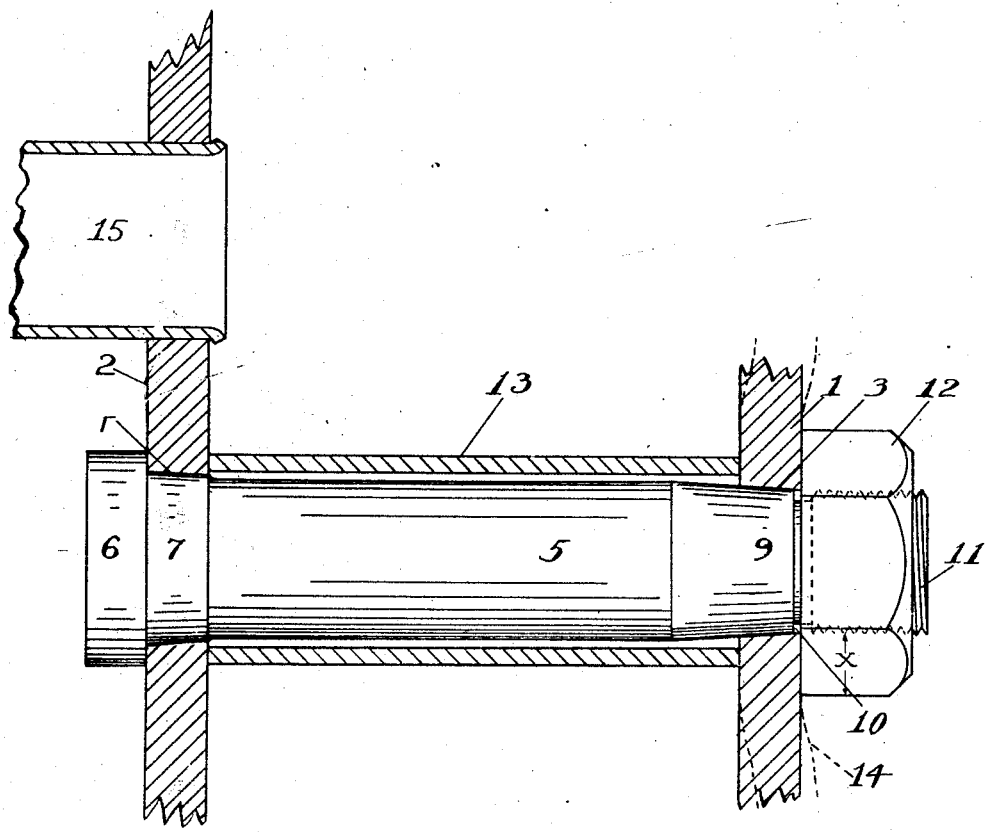
John F. L. Baker
Inventor
By Geo. B. Willcox
Attorney Patented Sept. 1, 1925.

1,551,781

UNITED STATES PATENT OFFICE.

JOHN F. L. BAKER, OF SAGINAW, MICHIGAN, ASSIGNOR TO THE WICKES BOILER CO., OF SAGINAW, MICHIGAN, A CORPORATION OF MICHIGAN.

STAY BOLT.

Application filed January 11, 1924. Serial No. 685,585.

*To all whom it may concern:*

Be it known that I, JOHN F. L. BAKER, a citizen of the United States, residing at Saginaw, in the county of Saginaw and State of Michigan, have invented certain new and useful Improvements in Stay Bolts; and I do hereby declare the following to be a full, clear, and exact description of the invention, such as will enable others skilled in the art to which it appertains to make and use the same.

This invention relates to stay bolts and pertains more particularly to boiler stay bolts used for reinforcing flat surfaces such as the plates that form the walls of the steam and water legs of water tube boilers.

In a previous Patent, No. 1,411,261, issued April 4, 1922, I described and claimed a stay bolt so constructed that it can quickly and easily be applied to the plates of a boiler.

In my previous construction the bolt body was enlarged near both ends, one enlargement being underneath the head and tapered, the other arrangement near the threaded end of the bolt and cylindrical. In the patent referred to the tightness of fit between this cylindrical enlargement and its hole in the plate was attained by means of a tapered compressible metal ring, forced into place by the nut.

In that construction the cylindrical enlargement on the bolt required a hole in the plate of larger diameter than the body of the bolt. My present construction employs a hole of smaller diameter than the body of the bolt.

The important practical advantage attained by the present construction is securing a maximum of annular plate area gripped by the flat face of the bolt, as well as tight fits in the plates.

Maximum clamping and plate reinforcing action is thus secured to prevent bulging of the unsupported plate area between the stay bolts of a boiler.

With the foregoing and certain other objects in view which will appear later in the specifications my invention comprises the devices described and claimed and the equivalents thereof.

My invention is illustrated in the accompanying drawing, being a part sectional view, the bolt being shown as applied to the leg of a water tube boiler.

As is clearly shown in the drawing, the device consists in a stay bolt adapted to fasten together in spaced relation the two plates 1 and 2 which comprise the side walls of the water leg of a boiler, for example the outer plate and tube sheet. The outer plate 1 is formed with a tapered hole 3, and tube sheet 2 has a similar but somewhat smaller hole 4, the taper being in the same direction as the taper of hole 3.

5 is the bolt body having the usual head 6 and taper 7 to fit the tapered hole 4. 9 is a smaller tapered part of the bolt that fits the tapered hole 3.

10 is a channel or groove at the base of the threaded end 11 of the bolt upon which the threaded nut 12 is screwed. 13 is the usual thimble or spacer between the plates 1 and 2.

The space between plates 1 and 2 may represent any space under pressure, as for example, the water space or steam space of the boiler.

The stay bolt is inserted by first placing the thimble 13 to register with the openings 3 and 4, then passing the stay bolt through the opening 4 of plate 2 until the tapered end 9 is received into the tapered opening of plate 1. At the same time the tapered part 7 at the head end of the bolt enters the tapered opening 4 of plate 2.

The relation between the length of thimble 13 and the spacing of the tapers 7 and 9 is such that both of these two tapers seat simultaneously and fit their respective tapered holes correctly when the bolt is driven tight under the pull of nut 12.

The bottom of the nut is preferably faced to present an area for uniform bearing against the outer face of plate 1.

The plate 1 on one side is supported by the end of the thimble 13 and on the other side by the flat face of nut 12. Internal pressure obviously tends to bulge plate 1 at any unsupported area, as indicated in an exaggerated manner by the dotted lines at 14. But this bulging tendency is in my present construction reduced to a minimum because of the fact that the area X of the plate around the opening 3 is uniformly supported by nut 12. When clamped in this manner and subjected to internal pressure the plate acts like a beam supported and fixed at both ends. Consequently the ability of the unsupported area to resist the bulging tendency of internal pressure is increased and the tendency to deflect is correspondingly lessened.

The tube sheet 2 shown at the left in the drawing is partly supported by the tubes 15 in those areas that are not stayed by bolts 5. Therefore, it is not necessary in practice to provide the tube sheet 2 with an extensive clamping area around the opening 4. Bolt head 6 may be made with a relatively small diameter since the direction of taper 7 is opposite the internal pressure.

The construction and arrangement of the stay bolt herein described well adapts it for economical quantity production from bar stock, the only operations required being those which can be readily performed in a turning lathe or thread miller.

The tapered faces of the openings 3 and 4 are reamed and the tapers 7 and 9 on the bolt are machined to fit the faces closely and accurately. The thimble or spacer 13 is also made accurately to length. The distance between the faces of plates 1 and 2 as fixed by thimble 13 is such that the tapers 7 and 9 simultaneously seat in the tapered openings 4 and 3 when nut 12 is forced to its final seat upon the outer face of plate 1.

By the combination of the thimble 13, the taper 9 and the flat faced nut 12 I have developed a new mode of operation in stay bolt practice. Heretofore several stay bolt designs have been accepted and approved within certain technical limits by the various underwriters' codes for boiler design, as for example, a stay bolt threaded throughout its length and screwed into both plates, the outer ends of said bolt riveted. In another accepted construction the riveting of the stay bolt end is omitted and instead nuts are threaded on the bolt ends. A still further accepted arrangement employs a metal washer between the plate and nut. The stay bolts that impart the greatest reinforcing effect to the plate surrounding the bolt opening receive the most favorable ratings, as will be apparent from the following example:

The U. S. marine formula for computing allowable working pressure is, divide the square of the plate thickness expressed in inches by the square of the pitch of the stay bolts in sixteenths of an inch and multiply the quotient by a constant, the value of which has been determined by experiment and differs with different types of stay bolts. A threaded stay bolt with riveted ends is allowed a constant equal to 112. Where a nut is used instead of the riveted end the allowed constant is 120 and where a thimble is employed with a bolt having a taper under the head of the bolt, as in my patent above referred to, the allowed constant is higher. It is thus seen that the value of the constant, and consequently the allowable working pressure for a given thickness of plate increases as the effectiveness of clamping the plate area that surrounds the bolt hole, is increased.

This clamping effect is greatly increased in my present construction because the slight endwise play of the plates 1 and 2, with respect to the two tapers 7 and 9 on the bolt, when nut 12 is tightened allows the thimble 13 to act as a hollow column clamped endwise between plates 1 and 2. Moreover, the bolt with its taper 9, the thimble 13 and nut when assembled together as herein described, provide the full equivalent of a heavy reinforcing ring on the plate around the bolt opening.

Having thus described my invention, what I claim and desire to secure by Letters Patent is:

In combination, a pair of plates spaced apart, a thimble between said plates, each plate formed with a tapered aperture extending therethrough, the aperture of one plate of larger diameter than the aperture of the other plate, and the tapers in the opposing plates being in the same direction, a bolt comprising a body, a head, a threaded end, and a nut therefor, a part of said bolt body adjacent the head tapered to fit the aperture of one of said plates, a part of said bolt body adjacent the threaded end tapered to fit the aperture of the other plate, whereby tightening said nut produces endwise compression in said thimble and draws both of the tapered parts of said bolts simultaneously into close engagement with the walls of the tapered openings in the respective plates.

In testimony whereof, I affix my signature.

JOHN F. L. BAKER.